(12) United States Patent
Han

(10) Patent No.: US 7,352,496 B2
(45) Date of Patent: Apr. 1, 2008

(54) IMAGE SCANNING DEVICE AND SHADING COMPENSATION METHOD THEREOF

(75) Inventor: Chun-ku Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 989 days.

(21) Appl. No.: 10/768,110

(22) Filed: Feb. 2, 2004

(65) Prior Publication Data

US 2004/0207883 A1    Oct. 21, 2004

(30) Foreign Application Priority Data

Apr. 15, 2003    (KR) .................. 10-2003-0023787

(51) Int. Cl.
*H04N 1/04* (2006.01)

(52) U.S. Cl. .................. 358/474; 358/461; 358/486; 358/475; 358/509; 382/274; 382/254; 348/241; 348/251

(58) Field of Classification Search .............. 358/474, 358/461, 486, 475, 509, 1.2, 504, 516, 498, 358/448, 3.26; 382/254, 274, 276; 348/241, 348/243, 251, 252

See application file for complete search history.

(56) References Cited

U.S. PATENT DOCUMENTS

| | | | | |
|---|---|---|---|---|
| 4,520,395 | A * | 5/1985 | Abe ........................ | 348/251 |
| 5,523,848 | A * | 6/1996 | Musso et al. ............. | 358/296 |
| 5,650,863 | A * | 7/1997 | Utagawa et al. .......... | 358/475 |
| 5,973,712 | A * | 10/1999 | Agano ..................... | 347/188 |
| 6,075,623 | A * | 6/2000 | Yun ........................ | 358/486 |
| 6,553,151 | B1 * | 4/2003 | Gahang .................... | 382/274 |
| 6,704,457 | B1 * | 3/2004 | Sugiura .................... | 382/274 |
| 6,958,829 | B2 * | 10/2005 | Mizoguchi et al. ........ | 358/3.23 |
| 7,102,797 | B2 * | 9/2006 | Sakai ....................... | 358/461 |
| 2002/0054374 | A1 * | 5/2002 | Inoue et al. .............. | 358/461 |
| 2004/0184112 | A1 * | 9/2004 | Ide ......................... | 358/461 |

(Continued)

FOREIGN PATENT DOCUMENTS

EP    0964569 A2    12/1999

(Continued)

OTHER PUBLICATIONS

Korean Official Action issued on Jun. 10, 2005, for Korea Patent Application No. 2004-10039678.7 (listing 1 reference).

*Primary Examiner*—Aung S. Moe
*Assistant Examiner*—Negussie Worku
(74) *Attorney, Agent, or Firm*—Stanzione & Kim, LLP

(57) ABSTRACT

An image scanning device and a shading compensation method include reading out a second region of a reference white sheet spaced by a predetermined distance from a white roller prior to reading out a to-be-scanned document to generate a reference shading compensation value; comparing the generated reference shading compensation value and a stored initial sheet shading compensation value for the second region to calculate a final shading compensation value of a first region of the white roller; and compensating for image data of the read document according to the calculated final shading compensation value. Accordingly, the present invention generates a shading profile and compensates for shading distortions according to characteristic changes of an image readout unit, such as a CIS, thereby enabling more precise image data to be obtained.

20 Claims, 4 Drawing Sheets

U.S. PATENT DOCUMENTS

2004/0223192 A1* 11/2004 Hiromatsu et al. ......... 358/474
2005/0134923 A1* 6/2005 Kim .......................... 358/3.26

FOREIGN PATENT DOCUMENTS

| | | |
|---|---|---|
| JP | 09-051406 | 2/1997 |
| JP | 09-134417 | 5/1997 |
| JP | 2000-349977 | 12/2000 |
| KR | 1020000009157 | 2/2000 |

* cited by examiner

IMAGE SCANNING DEVICE AND SHADING COMPENSATION METHOD THEREOF

CROSS-REFERENCE TO RELATED APPLICATIONS

This application claims the benefit of Korean Patent Application No. 2003-23787, filed on Apr. 15, 2003, in the Korean Intellectual Property Office, the disclosure of which is incorporated herein by reference.

BACKGROUND OF THE INVENTION

1. Field of the Invention

The present invention relates to an image scanning device and a shading compensation method thereof, and more particularly, to an image scanning device and a shading compensation method of compensating for shading distortions more precisely by generating a shading profile according to changes of ambient temperatures or characteristic changes of an image optical sensor scanning images.

2. Description of the Related Art

Image scanning devices, such as a scanner, are devices reading out in a graphic form image information represented on sheets of paper, such as pictures or drawings. Such image scanning devices are classified into a flat bed type device and a sheet feed type device.

The flat bed type device uses a mechanism in which an image optical sensor moves with respect to a document placed on a flat bed to scan the document as in a photocopier, whereas the sheet feed type device uses a mechanism in which the image optical sensor is fixed and the document moves with respect to the image optical sensor to scan documents sheet by sheet as in a facsimile machine.

Here, the image scanning device of a sheet feed type uses the image optical sensor to read out images of the document when the document is inserted between the image optical sensor and a white roller. Described in more detail, the image scanning device uses an image optical sensor to read out a to-be-scanned document (referred to as a scanning document, hereinafter) if the scanning document picked up by a transfer roller is transferred to the white roller. At this time, a contact image sensor (CIS), a charge coupled device (CCD), or the like is used for the image optical sensor.

However, the images read out by the image optical sensor, such as the CIS, the CCD, or the like, have shading distortions occurring thereon when the document is scanned, due to physical characteristics of an optical system in the image scanning device, electrical characteristics of the image optical sensor itself, contamination of the white roller, and so on. Accordingly, the image scanning device stores a shading profile in a certain memory so as to compensate for the shading distortions occurring during scanning of the document. The shading profile is a reference white color value obtained by scanning the white roller and stored as a factory default at a product adjustment stage in a factory where the image scanning devices are manufactured. That is, a conventional image scanning device compensates for the shading distortions occurring during scanning of a document to generate an output, according to the stored shading profile.

However, the image optical sensor experiences its characteristic changes due to a long-term usage or changes of an ambient temperature of the image scanning device. That is, it is preferable that the shading profile obtained at the factory adjustment stage has the characteristics as shown in an 'A' waveform (shown in a dotted line) of FIG. 1. However, the shading distortions occur as shown in a 'B' waveform of FIG. 1 due to the characteristic changes of the image scanning device.

Accordingly, if the characteristics of the image optical sensor are changed, the conventional image scanning device compensates for a scanned image according to the shading profile obtained in a state that the changes of the characteristics of the image optical sensor are not considered, thereby causing a problem that precise compensations can not be performed as compared to an actual image recorded on a document. That is, the shading profile stored in a certain memory is a compensation value to compensate for an image read out by the image optical sensor prior to its characteristic changes. Therefore, if an image read out by the characteristics-changed image optical sensor is compensated according to the stored shading profile, the shading distortions occur on the compensated image. Accordingly, the image quality of the scanned image deteriorates, thereby lowering a product reliability.

SUMMARY OF THE INVENTION

Accordingly, it is an aspect of the present invention to provide a shading-compensatable image scanning device and a method capable of compensating for shading distortions more precisely by periodically generating a shading profile according to characteristic changes of an image optical sensor such as a CIS.

Additional aspects and/or advantages of the invention will be set forth in part in the description which follows and, in part, will be obvious from the description, or may be learned by practice of the invention.

The foregoing and/or other aspects are achieved by providing an image scanning device including a reference white sheet spaced from a white roller by a certain distance; an image readout unit provided opposite to the white roller and the reference white sheet, to read out an image; a first storage to store an initial roller shading compensation value corresponding to a first region of the white roller and an initial sheet shading compensation value corresponding to a second region of the reference white sheet, the values being initially read out by the image readout unit; a control unit to control the image readout unit to read out the second region prior to reading out a document so that a reference shading compensation value is generated, to compare the generated reference shading compensation value and the initial sheet shading compensation value stored in the first storage, and to calculate a final shading compensation value of the first region; and an image compensation unit to compensate for image data of the read document according to the calculated final shading compensation value.

According to another aspect of the invention, the control unit compares the generated reference shading compensation value and the initial sheet shading compensation value stored in the first storage to calculate a shading compensation coefficient, and multiplies the calculated shading compensation coefficient and the initial roller shading compensation value to calculate the final shading compensation value.

According to yet another aspect of the invention, the calculated shading compensation coefficient is a change rate of the initial sheet shading compensation value with respect to the generated reference shading compensation value.

According to still another aspect of the invention, the image scanning device further comprises a second storage to store the generated reference shading compensation value and the calculated final shading compensation value, wherein, in a case of plural documents, the control unit generates a reference shading compensation value and a final shading compensation value in advance before each of the plural documents is read out, and updates the second storage with the generated values.

According to another aspect of the invention, the reference white sheet is spaced from the white roller by a predetermined distance in a longitudinal direction of the white roller and disposed on an area other than a document transfer path, and the image readout unit is any of a contact image sensor (CIS) optical sensor and a charge coupled device (CCD) optical sensor.

The foregoing and/or other aspects of the invention are also achieved by providing a shading compensation method used with an image scanning device, the shading compensation method including reading out a second region of a reference white sheet spaced by a predetermined distance from a white roller prior to reading out a to-be-scanned document to generate a reference shading compensation value; comparing the generated reference shading compensation value and a stored initial sheet shading compensation value for the second region to calculate a final shading compensation value for a first region of the white roller; and compensating for image data of the read document according to the calculated final shading compensation value.

According to another aspect of the invention, the calculating of the final shading compensation value includes comparing the generated reference shading compensation value and the stored initial sheet shading compensation value to calculate a shading compensation coefficient; and multiplying the calculated shading compensation coefficient and a stored initial roller shading compensation value of the first region to calculate the final shading compensation value of the first region.

According to another aspect of the invention, the shading compensation method further comprises storing the generated reference shading compensation value and the calculated final shading compensation value after the operation of calculating the final shading compensation value is performed, wherein, in a case of plural documents, a reference shading compensation value and a final shading compensation value are generated in advance before each of the plural documents is read out, and the values are updated in the storing operation.

According to another aspect of the invention, any of CIS and CCD image optical sensors performs reading out the document and the second region of the reference white sheet.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
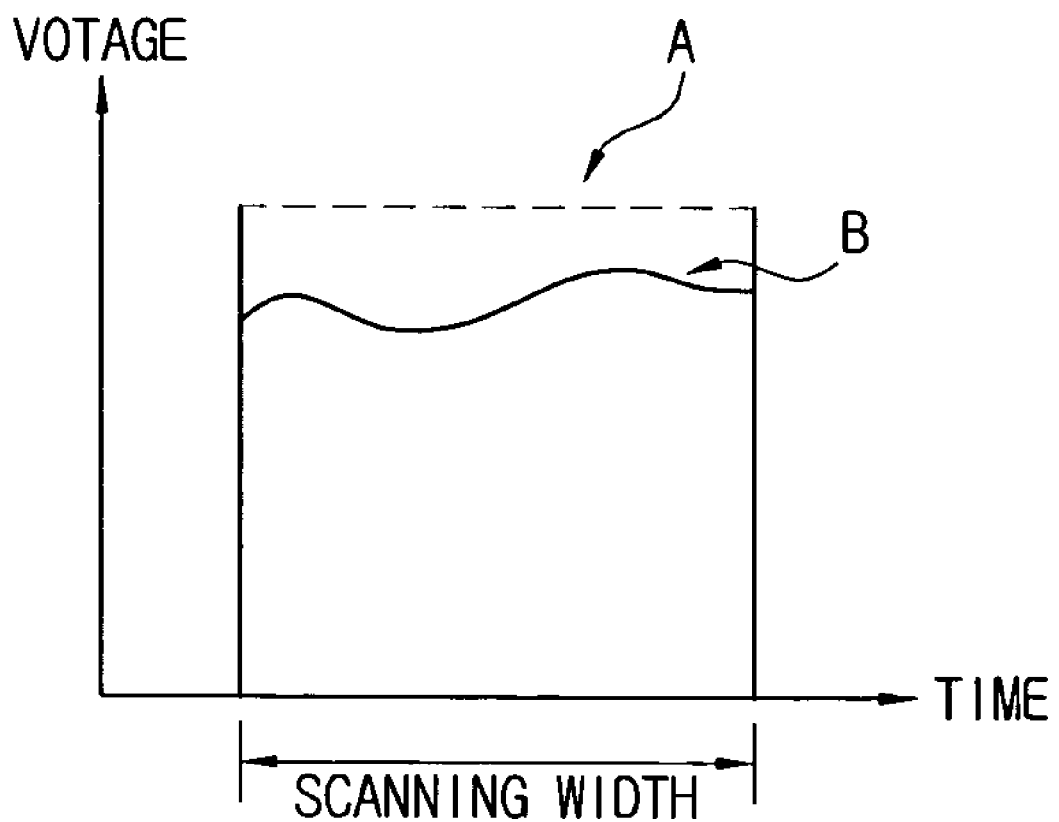
FIG. 1 is a voltage waveform view showing shading distortions obtained by a conventional image optical sensor.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
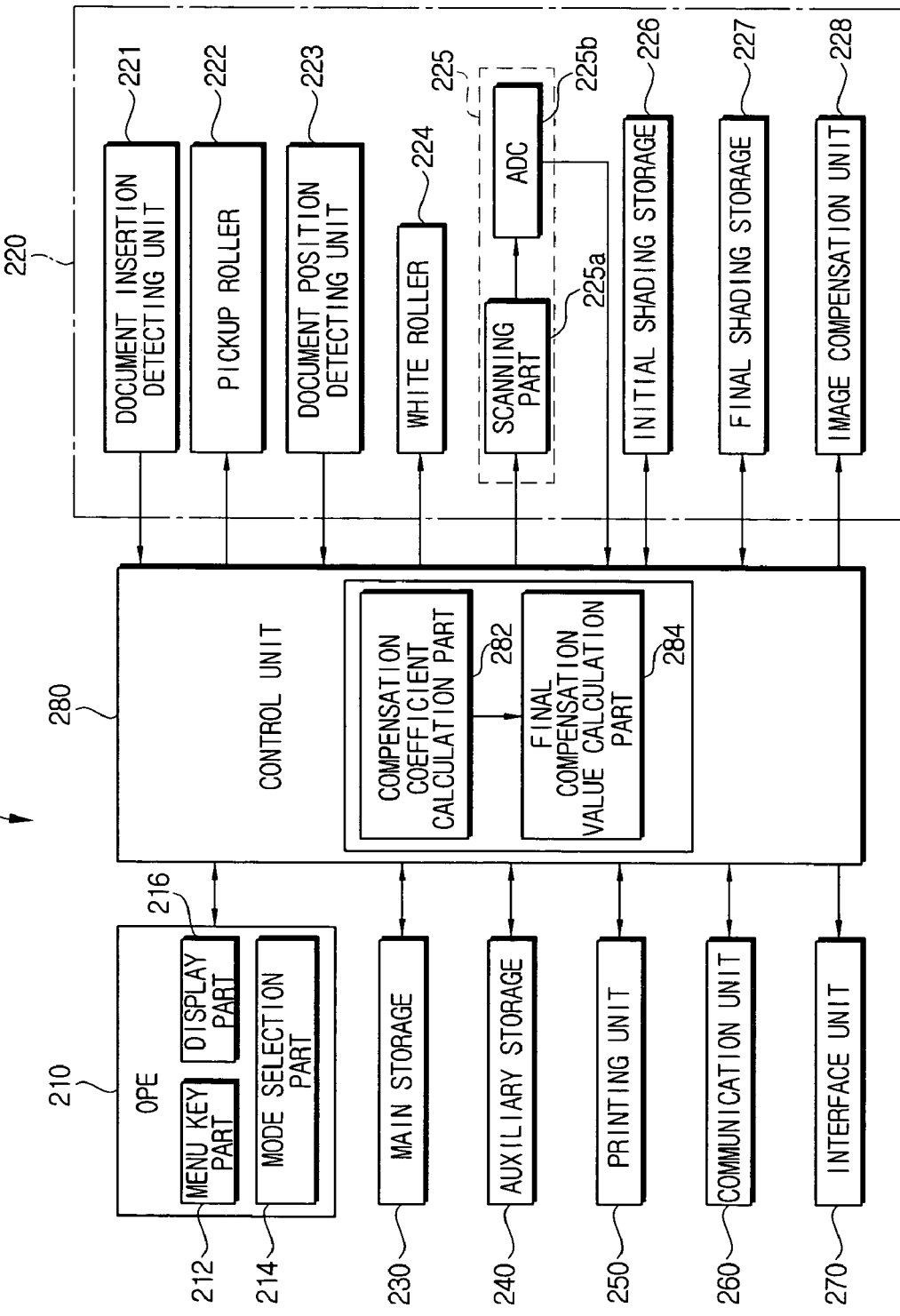
FIG. 2 is a block diagram schematically showing a multi function apparatus having an image scanning device to compensate for shading distortions according to an embodiment of the present invention.

FIG. 2 is a block diagram schematically showing a multi function apparatus 200 having an image scanning device 220 to compensate for shading distortions according to an embodiment of the present invention.

The multi function apparatus 200 having the image scanning device 220 is a device having functions of a printer and a facsimile machine in addition to a function of a sheet feed type scanner.

Referring to FIG. 2, the multi function apparatus 200 has an operating panel (OPE) 210, the image scanning device 220, a main storage 230, an auxiliary storage 240, a printing unit 250, a communication unit 260, an interface unit 270, and a control unit 280.

The OPE 210 has a menu key part 212, a mode selection part 214, and a display part 216.

The menu key part 212 is provided with various function keys (not shown) to support inputs of letters and/or numbers to set or operate functions of the multi function apparatus 200.

The mode selection part 214 is a manipulation key to enable a user to select any of a photocopy mode, a scanning mode, and a transmission/reception mode for an inserted document. For example, if the scanning mode is selected from the mode selection part 214, the mode selection part 214 outputs a scanning execution commanding signal to the control unit 280 which will be described later.

The display part 216 displays one or more operation states of the multi function apparatus 200 based on the controls of the control unit 280, and a liquid crystal display is generally used for the display part 216, but the display part 216 is not limited to the liquid crystal display.

The image scanning device 220, upon detecting that at least one scanning document is inserted after the scanning mode is selected from the mode selection part 214, continuously reads out or scans one or more documents sheet by sheet and converts the scanned document into image data. The converted image data is outputted to the control unit 280.

The main storage 230 is a non-volatile memory to store various control programs to perform overall operations of the multi function apparatus 200.

The auxiliary storage 240 is a volatile memory to store data occurring during operations of the multi function apparatus 200 and detailed information on the data. For example, the auxiliary storage 240 stores the image data corresponding to a document scanned to perform the photocopy mode set from the OPE 210 and the image data corresponding to a document received from an external network (not shown).

The printing unit 250 performs a printing job when a print command is outputted from the menu key part 212 of the OPE 210. For example, when the print command is selected for the data of an image scanned by the image scanning device 220, the printing unit 250 prints the scanned data on a sheet of paper.

The communication unit 260 is a communication module to perform a communication function with an external device (not shown), such as a facsimile machine, and connects telephone lines (not shown) with a modem (not shown) through a network control unit (NCU) to perform the communication function, for example.

Further, the communication unit 260 transmits to an external device (not shown) the image data corresponding to the document scanned by the image scanning device 220 or the image data corresponding to a document stored in the auxiliary storage 240, and receives predetermined image data from an external device (not shown). The received image data is printed through the printing unit 250, or transmitted to an external network (not shown) through the interface unit 270.

The interface unit 270 is connected with an external network (not shown) to support mutual data communications, and uses a universal serial bus module, for example. The external network (not shown) is referred to as computers or all other devices, such as networks through computers, that can provide print data.

If electrical power is applied to the multi function apparatus 200, the control unit 280 controls the overall operations of the multi function apparatus 200 as described above according to an output signal of the OPE 210 and the control programs stored in the main storage 230.

In more detail, if a photocopy mode selection signal or a scanning mode selection signal is received from the mode selection part 214, the control unit 280 controls the image scanning device 220 to photocopy or scan an inserted document after it is determined whether a front end of the document is advanced forward. Further, the control unit 280 stores the image data of the scanned document in the auxiliary storage 240, controls the printing unit 250 to perform the printing operations, and transfers the image data to an external device (not shown) or an external network (not shown) through the communication unit 260 or the interface unit 270.

Figure 3:
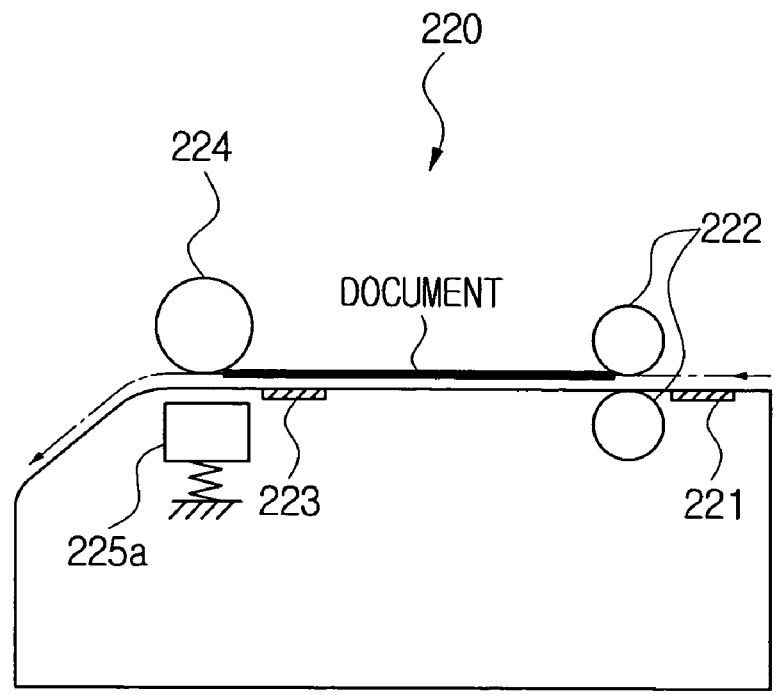
FIG. 3 is a front sectional view schematically showing the image scanning device of FIG. 2.
Figure 4:
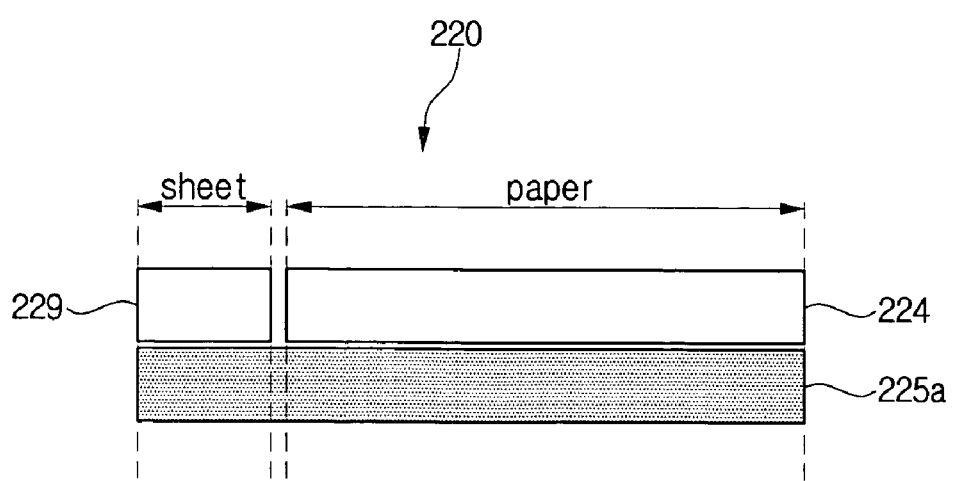
FIG. 4 is a side sectional view schematically showing the image scanning device of FIG. 2.

FIG. 3 is a front sectional view schematically showing the image scanning device 220 of FIG. 2, and FIG. 4 is a side sectional view schematically showing the image scanning device 220 shown in FIG. 2.

Referring to FIGS. 2 through 4, the image scanning device 220 has a document insertion detecting unit 221, a transfer (pickup) roller 222, a document position detecting unit 223, a white roller 224, an image readout unit 225, an initial shading storage 226, a final shading storage 227, an image compensation unit 228, a reference white sheet 229, and the control unit 280.

Here, the control unit 280 is a controller used with the multi function apparatus 200 in which the image scanning device 220 is provided. The control unit 280 may be installed in the image scanning device 220 for the sake of explanatory convenience.

The document insertion detecting unit 221 is a sensor to detect whether a to-be-scanned document (referred to as a scanning document, hereinafter) is inserted in a document-mounting unit (not shown) such as a paper supply cassette. In the present invention, if the image scanning device 220 has a sheet feed scanning function and an additional automatic paper-feeding unit, the document insertion detecting unit 221 detects whether plural documents are inserted in the document-mounting unit (not shown).

If a document inserting detecting signal is received from the document insertion detecting unit 221, the transfer roller 222 picks up one or more documents sheet by sheet, and transfers the document to a set reference position along a document transfer path. The set reference position is a position at which the white roller 224 rotates and simultaneously picks-up the document transferred by the transfer roller 222, wherein the white roller 224 will be described later.

If a document detection signal is received from the document position detecting unit 223 when the document arrives at the set reference position, the transfer roller 222 stops its driving, and the white roller 224 starts its driving. The white roller 224 is installed at a predetermined position on the document transfer path. The white roller 224 picks up the transferred document and places the transferred document in close contact with the image readout unit 225. Accordingly, the image of the document is clearly read out.

The reference white sheet 229 is spaced by a certain distance from the white roller 224 disposed on an upper part of the document transfer path. At this time, the reference white sheet 229 is preferably spaced apart from the white roller 224 by the certain distance in the longitudinal direction of the white roller 224. The reference white sheet 229 is one like a general white sheet of paper and is provided to calculate a shading compensation value every time a scanning job is performed. The reference white sheet is disposed adjacent to the white roller 224 in a direction perpendicular to the document transfer path.

The image readout unit 225 has a scanning part 225a and an analog/digital converter (ADC) 225b and is provided below the document transfer path and opposite to the white roller 224 and the reference white sheet 229.

The scanning part 225a scans the document picked up by the white roller 224 to generate a document image, and performs a photoelectric conversion of the document image into an analog signal. In general, the scanning part 225a uses an image optical sensor of a CIS or a CCD, and generates a voltage signal proportional to light reflecting from the white roller 224 and the reference white sheet 229.

Since the CIS or CCD is a well known image optical sensor, detailed descriptions of the image optical sensor will be omitted from the following description. However, the CIS is a small-sized sensor incorporating a light source (not shown), lenses (not shown), a sensor (not shown), and so on, which are necessary elements to scan images recorded on documents, and the CIS can be small-sized and light-weighted as compared to the CCD.

The ADC 225b converts the photoelectrically converted analog signal of the image readout unit 225 into digital image data having the pre-set number of bits. For example, provided that image information of an analog form is converted into 8-bit digital image data, a brightest value M of the converted digital image data is determined as 255, that is, $256-1=255$, based on $(2^m-1)$. Here, a gradation of an image that is used in the present invention preferably uses a 256-level gradation in which a single pixel is represented by 8 bits as in usual occasions, but the number of bits can be increased or decreased depending upon application fields.

As a pixel is represented by more bits than the 8 bits when the analog/digital conversion is performed, the pixel can be more precisely and minutely expressed, but it is inevitable that relatively more resources are required and a computing amount of a signal exponentially increases when the signal is processed.

The initial shading storage 226 used as a first storage is a non-volatile memory. The initial shading storage 226 stores an initial roller shading compensation value corresponding to a first region (a document scanning section 'paper' shown in FIG. 4) of the white roller 224 and an initial sheet shading compensation value corresponding to a second region (a reference sheet section 'sheet' shown in FIG. 4) of the reference white sheet 229 when the first and second regions are scanned by the image readout unit 225. Here, the first and second regions are a predetermined region of the white roller 224 and a predetermined region of the reference white sheet 229, respectively, that are disposed opposite to the image readout unit 225 with respect to the document transfer path. Further, the initial roller shading compensation value and the initial sheet shading compensation value stored in the initial shading storage 226 generally have the image data of '255' brightness values as a factory default value set at the manufacturing stage of the multi function apparatus 200.

In the present invention, the control unit 280 like a central processing unit controls the image readout unit 225 to generate a reference shading compensation value by performing a scanning job with respect to the second region of the reference white sheet 229 before a document is scanned, if the scanning mode selection signal is received from the mode selection part 214.

Further, the control unit 280 compares the digital image data of the second region of the reference white sheet 229, that is, the scanned reference shading compensation value, with the initial sheet shading compensation value stored in the initial shading storage 226 to calculate a final shading compensation value of the first region of the white roller 224.

In order to calculate the final shading compensation value, the control unit 280 has a compensation coefficient calculation part 282 and a final compensation value calculation part 284.

The compensation coefficient calculation part 282 compares the reference shading compensation value generated through the scanning job of the image readout unit 225 with the initial sheet shading compensation value stored in the initial shading storage 226 to calculate a shading compensation coefficient. Here, the calculated shading compensation coefficient is a change rate, e.g., a proportion value, of the initial sheet shading compensation value with respect to the reference shading compensation value.

The final compensation value calculation part 284 multiplies the calculated reference shading compensation coefficient and the stored initial roller shading compensation value to calculate the final shading compensation value of the first region of the white roller 224. That is, the final shading compensation value is a shading profile to compensate for the digital image data read out from a scanning document so that the digital image data maintains its uniform level of '255' brightness values, for example.

The final shading storage 227 used as a second storage is a volatile memory. The final shading storage 227 stores the reference shading compensation value and the final shading compensation value of the second region of the reference white sheet 229.

The image readout unit 225 scans the second region (indicated by 'sheet' of FIG. 4) of the reference white sheet 229 every time the documents are scanned sheet by sheet, so that the reference shading compensation value is updated. Accordingly, whenever the documents are scanned sheet by sheet, the reference shading compensation value and the final shading compensation value stored in the final shading storage 227 are updated.

In order to update the reference shading compensation value and the final shading compensation value, the control unit 280 controls the final shading storage 227 to update the generated reference shading compensation value and the calculated final shading compensation value.

The image compensation unit 228 scans the scanning document, and compensates for the digital image data outputted from the ADC 225b according to the final shading compensation value stored in the final shading storage 227.

Figure 5:
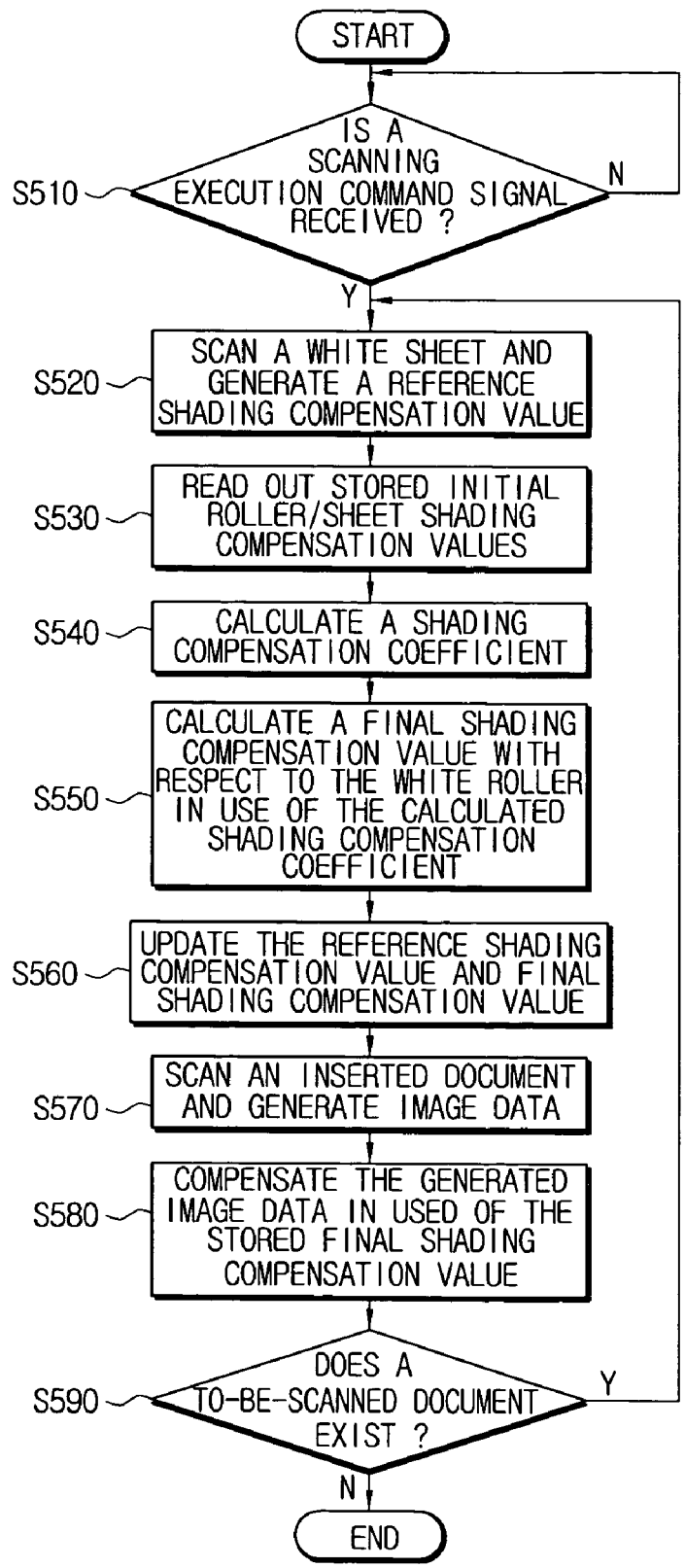
FIG. 5 is a flow chart showing a driving method used with the image scanning device of FIG. 2 according to another embodiment of the present invention.

FIG. 5 is a flow chart to explain a driving method used with the image scanning device 220 shown in FIG. 2 according to another embodiment of the present invention.

Referring to FIGS. 2 through 5, if the scanning mode is selected from the mode selection part 214 and the scanning execution command signal is received in operation S510, the control unit 280 controls the scanning part 225a to scan the second region (the 'sheet' section of FIG. 4) of the reference white sheet 229, and controls the ADC 225b to generate a reference shading compensation value of the scanned second region in operation S520.

If the reference shading compensation value is generated, the control unit 280 reads out the initial roller shading compensation value and the initial sheet shading compensation value stored in the initial shading storage 226 in operation S530.

If operation S530 is performed, the control unit 280 compares the generated reference shading compensation value with the read initial roller shading compensation value to calculate the shading compensation coefficient in operation S540. That is, the control unit 280 controls the compensation coefficient calculation part 282 to calculate the shading compensation coefficient. The shading compensation coefficient is a change rate of the initial sheet shading compensation value with respect to the reference shading compensation value. Further, the control unit 280 controls the final compensation value calculation part 284 to multiply the calculated shading compensation coefficient and the readout initial roller shading compensation value to calculate the final shading compensation value of the first region (the 'paper' section of FIG. 4) of the white roller 224 in operation S550.

If operation S550 is performed, the control unit 280 controls the final shading storage 227 to store the reference shading compensation value and the final shading compensation value in operation S560. That is, the control unit 280 performs operations S510 to S550 every time the documents are scanned sheet by sheet, thereby calculating a new reference shading compensation value and the final shading compensation value, and then the final shading storage 227 is updated with the above two calculated values.

If operation S560 is performed, the control unit 280 controls the white roller 224, scanning part 225a, and ADC 225b to scan the document transferred by the transfer roller 222 and inserted between the white roller 224 and the scanning part 225a and generate the image data (S570). That is, in operation S570, the scanning part 225a scans a portion of the 'paper' section of FIG. 4 on which the document is inserted to output the image data.

Further, the control unit 280 controls the image compensation unit 228 to compensate for the document image data generated in operation S570 according to the final shading compensation value stored in the final shading storage 227 in operation S580. The image-compensated image data can be stored in the auxiliary storage 240.

If operation S580 is performed, the control unit 280 controls the document inserting detecting unit 221 to determine whether any scanning document remains in operation S590. If the document detection signal corresponding to the remaining documents is received from the document insertion detecting unit 221 in operation S590, the control unit 280 repeats operations S520 to S580.

The image scanning device 220 first scans the reference white sheet attached to a main body of the image scanning device 220 according to a shading compensation job, and calculates the shading compensation coefficient to convert a waveform 'B' of FIG. 1 into a reference white color value of a waveform 'A' of FIG. 1. The reference white color value of the wave form 'A' of FIG. 1 is constant compared with the variable waveform 'B' of FIG. 1. Thereafter, the present invention scans a document and applies to the scanned image data a final shading compensation value calculated from the shading compensation coefficient, so that nearly the same scanned image as the image recorded on the document can be obtained.

As described above, in the image scanning device and shading compensation method according to the present invention, a reference white sheet is provided on the region other than a document transfer path along which the scanning document is transferred so that a shading profile can be produced according to characteristic changes of an image optical sensor such as a CIS. That is, the present invention scans the reference white sheet whenever a document is scanned, to periodically generate a final shading compensation value so that image data distortions due to the characteristic changes of the scanning part can be more precisely compensated. Accordingly, the present invention enables users to obtain nearly the same scanned image as the real image of the document.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image scanning device, comprising:
   a white roller to feed a document along a document transfer path;
   a reference white sheet spaced by a certain distance from the white roller; an image readout unit provided opposite to the white roller and the reference white sheet with respect to the document transfer path to read out image data from the document;
   a first storage to store an initial roller shading compensation value of a first region of the white roller and an initial sheet shading compensation value of a second region of the reference white sheet, the values being initially read out by the image readout unit;
   a control unit to control the image readout unit to read out the second region of the reference white sheet prior to reading out the image data so that a reference shading compensation value is generated, and to compare the generated reference shading compensation value with the initial sheet shading compensation value stored in the first storage to calculate a final shading compensation value of the first region; and
   an image compensation unit to compensate for the readout image data according to the calculated final shading compensation value.

2. The image scanning device as claimed in claim 1, wherein the control unit compares the generated reference shading compensation value and the initial sheet shading compensation value stored in the first storage to calculate a shading compensation coefficient, and multiplies the calculated shading compensation coefficient and the initial roller shading compensation value to calculate the final shading compensation value.

3. The image scanning device as claimed in claim 2, wherein the calculated shading compensation coefficient is a change rate of the initial sheet shading compensation value with respect to the generated reference shading compensation value.

4. The image scanning device as claimed in claim 1, further comprising:
   a second storage to store the generated reference shading compensation value and the calculated final shading compensation value, wherein the control unit generates a reference shading compensation value and a final shading compensation value in advance before each of a plurality of documents is read out, and updates the generated reference shading compensation value and the calculated final shading compensation value stored in the second storage with the generated reference and final shading compensation values.

5. The image scanning device as claimed in claim 1, wherein the reference white sheet is spaced from the white roller by a predetermined distance in a longitudinal direction of the white roller and disposed on an area other than the document transfer path.

6. The image scanning device as claimed in claim 1, wherein the image readout unit is a contact image sensor or a charge coupled device.

7. A shading compensation method used with an image scanning device, the method comprising:
   reading out a region of a reference white sheet spaced by a predetermined distance from a white roller prior to reading out a to-be-scanned document to generate a reference shading compensation value;
   comparing the generated reference shading compensation value and a stored initial sheet shading compensation value of the certain region of the reference white sheet to calculate a final shading compensation value of a certain region of the white roller; and
   compensating for image data of the read document according to the calculated final shading compensation value.

8. The shading compensation method as claimed in claim 7, wherein the operation of calculating the final shading compensation value comprises:
   comparing the generated reference shading compensation value and the stored initial sheet shading compensation value to calculate a shading compensation coefficient; and
   multiplying the calculated shading compensation coefficient and a stored initial roller shading compensation value of the certain region of the white roller to calculate the final shading compensation value of the certain region of the white roller.

9. The shading compensation method as claimed in claim 8, wherein the calculated shading compensation coefficient is a change rate of the initial sheet shading compensation value with respect to the generated reference shading compensation value.

10. The shading compensation method as claimed in claim 7, further comprising:
    storing the generated reference shading compensation value and the calculated final shading compensation value after the operation of calculating the final shading compensation value is performed, wherein a reference shading compensation value and a final shading compensation value are generated in advance before each of plural documents is read out, and the values are updated in the storage operation.

11. The shading compensation method as claimed in claim 7, wherein the reference white sheet is spaced from the white roller by a predetermined distance in a longitudinal direction of the white roller and disposed on an area other then a document transfer path.

12. The shading compensation method as claimed in claim 7, wherein the document and the region of the reference white sheet are read out using a CIS or CCD image optical sensor.

13. An image scanning device, comprising:
   a white roller to feed a document along a document transfer path;
   a reference sheet disposed adjacent to the white roller;
   an image read out unit to read the document to generate image data;
   a first storage to store an initial roller shading compensation value corresponding to a first region of the white roller and an initial sheet shading compensation value corresponding to a second region of the reference sheet; and
   a control unit to control the image readout unit to read out the second region of the reference sheet to generate a reference shading compensation value, and to calculate a final shading compensation value according to the generated reference shading compensation value and the stored initial sheet and roller shading compensation values to compensate for the generated image data using the final shading compensation value.

14. The image scanning device as claimed in claim 13, wherein the control unit generates a shading compensation coefficient according to the generated reference shading compensation value and the stored initial sheet shading compensation value and calculates the final shading compensation value according to the shading compensation coefficient and the initial roller shading compensation value.

15. The image scanning device as claimed in claim 13, wherein the first storage comprises a non-volatile memory.

16. The image scanning device as claimed in claim 13, wherein the generated reference shading compensation value is different from the stored initial sheet shading compensation value due to characteristic changes of the image readout unit.

17. The image scanning device as claimed in claim 13, wherein the image data has an image data distortion in a scanning width of the image readout unit due to characteristic changes of the image readout unit, and the image data distortion of the image data is compensated using the final shading compensation value.

18. The image scanning device as claimed in claim 13, wherein the reference shading compensation value varies due to a characteristic change of the image scanning device when the image readout unit reads out the document, and the final shading compensation value represents the characteristic change of the image scanning device.

19. The image scanning device as claimed in claim 13, wherein the reference sheet and the white roller are disposed on a line having an angle with the document transfer path.

20. The image scanning device as claimed in claim 13, wherein the first region of the white roller is spaced apart from the second region of the reference sheet by a distance in a direction having an angle with the document transfer path.

* * * * *